Figure 1:
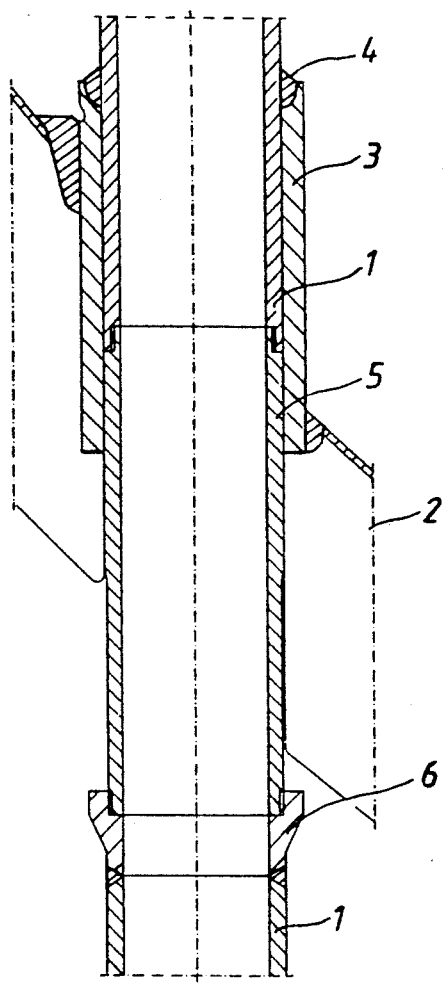

United States Patent [19]

Borrman et al.

[11] Patent Number: 5,209,894
[45] Date of Patent: May 11, 1993

[54] METHOD FOR SEALING A LEAK FROM A CONTROL ROD DRIVE STUB TUBE IN A NUCLEAR POWER REACTOR

[75] Inventors: Bo Borrman; Hans Kornfeldt; Lars-Ake Körnvik; Per Sundlöf; Lars Törnblom, all of Västerås, Sweden

[73] Assignee: ABB Atom AB, Västerås, Sweden

[21] Appl. No.: 770,486

[22] Filed: Oct. 3, 1991

[51] Int. Cl.$^5$ ............................................. G21C 13/28
[52] U.S. Cl. ...................................... 376/203; 376/286
[58] Field of Search ...................... 376/203, 204, 286; 285/381

[56] References Cited

U.S. PATENT DOCUMENTS

| | | | |
|---|---|---|---|
| 4,469,357 | 9/1984 | Martin | 285/381 |
| 4,872,713 | 10/1989 | Kapgan | 285/381 |
| 5,006,300 | 4/1991 | Jönsson et al. | 376/203 |
| 5,120,488 | 6/1992 | Borrman et al. | 376/203 |
| 5,124,112 | 6/1992 | Borrman et al. | 376/203 |

Primary Examiner—Donald P. Walsh
Assistant Examiner—Frederick H. Voss
Attorney, Agent, or Firm—Watson, Cole, Grindle & Watson

[57] ABSTRACT

A method for sealing a leak between a control rod drive (CRD) stub tube (3) arranged in a reactor wall (2) and a tubular CRD housing (1) extending through the CRD stub tube (3) and the vessel wall (2). According to the invention, this sealing is obtained by deforming a suitably shaped element of memory metal below the transition temperature of the memory metal in such a way that it can be inserted, in the form of a sleeve (5) or a ring, into or around the CRD housing (1) where said housing passes through the vessel wall (2), or alternatively replace part of the CRD housing (1) at the passage through the vessel wall (2). Then when the memory metal is heated to above the transition temperature, it strives to resume its original shape which shall then have been such that the desired seal is obtained.

6 Claims, 2 Drawing Sheets

METHOD FOR SEALING A LEAK FROM A CONTROL ROD DRIVE STUB TUBE IN A NUCLEAR POWER REACTOR

The present invention relates to a method for sealing of leaks in a nuclear power reactor, which are difficult to reach, by utilizing sealing devices made of memory metal.

In a nuclear power reactor a large quantity of pipe sockets are welded around holes provided in the bottom of the reactor vessel, these pipe sockets serving as passages for the tubular control rod drive housings (hereinafter abbreviated CRD housings). These CRD housings are sealed against the pipe sockects by means of a weld extending around the housing. In this weld or in the control rod drive stub tube (hereinafter abbreviated CRD stub tube), cracks may arise through which reactor water leaks out and runs downwards between the wall of the reactor vessel and the CRD housing. Previously, a method for sealing this leak has comprised rolling out the CRD housing, from inside, against the reactor wall. However, this sealing has never turned out quite satisfactory and, in addition, has been difficult to carry out.

The present invention relates to a method by which, by means of rings or sleeves of memory metal, the above type of sealing is achieved between CRD housing and vessel wall with a much more satisfactory result.

In accordance with a first possible method according to the invention, part of the CRD housing, adjoining the reactor vessel wall, is cut away and removed. A sleeve of memory metal, which above the transition temperature of the memory metal has approximately the same dimensions as the removed part of the CRD housing but with larger outside diameter, is deformed at a temperature below the transition temperature into an outside diameter substantially equal to or less than that of the removed part. Thereafter, the sleeve is inserted in the place of the removed part and is heated to above the transition temperature such that the outer wall of the sleeve is sealingly pressed against the surrounding vessel wall. In this way, a satisfactory and lasting seal is obtained in a simple manner.

According to a second alternative method, inside that part of the CRD housing which extends through the vessel wall, a slot is provided around the inner circumference of the CRD housing, whereupon a sleeve of memory metal with an outside diameter, which at a temperature above the transition temperature is larger than the largest diameter of the slot, is deformed below the transition temperature into a smaller outside diameter than the inside diameter of the CRD housing, the sleeve then being inserted into the slot and heated to above the transition temperature such that the sleeve sealingly presses the outer wall of the CRD housing against the vessel wall. Also this method provides a seal which is lasting and satisfactory and, if possible, even simpler to carry out. In an alternative embodiment, the CRD housing is first rolled out against the surrounding vessel wall, the memory metal sleeve then being inserted according to the above. In this way, the sealing pressure obtained by the rolling is strengthened and made permanent.

A third method for achieving sealing by means of memory metal between the CRD housing and the vessel wall, in accordance with the inventive concept, comprises providing, on the outside of the vessel, a slot in the vessel wall around the CRD housing. A ring of memory metal which, above the transition temperature, has a larger outside diameter and a smaller inside diameter than the slot is deformed into a substantially smaller outside diameter and larger inside diameter, respectively, than the slot and is thereafter inserted into the slot and heated to above the transition temperature such that the outer side of the ring is sealingly pressed against the vessel wall and its inner side against the CRD housing.

Figure 2:
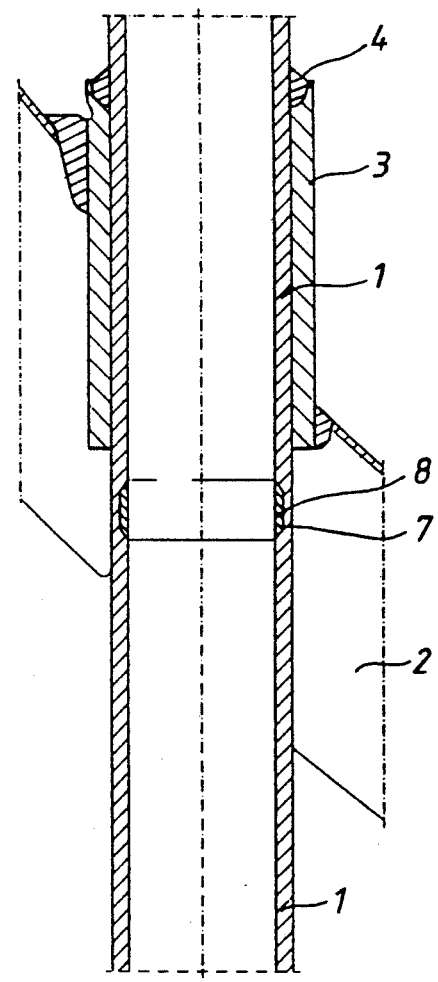
Figure 3:
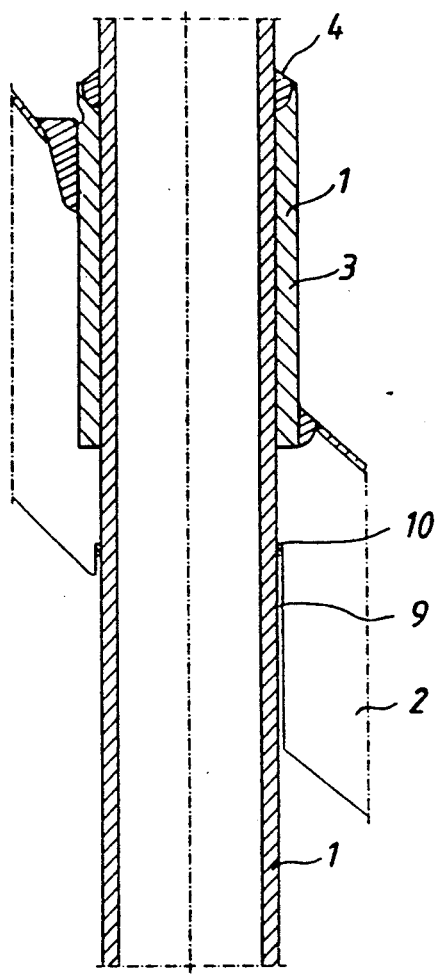
Figure 4:
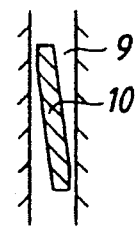
Figure 5:
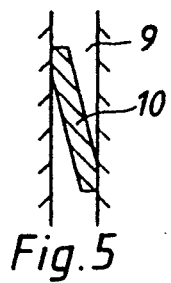
Figure 6:
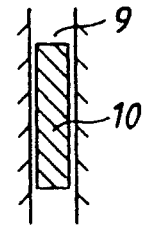
Figure 7:
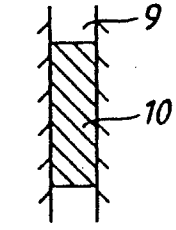

The invention will be most readily understood with reference to the accompanying drawings, wherein FIG. 1 shows an embodiment according to which part of the CRD housing has been cut away and replaced by memory metal, FIG. 2 shows a sleeve of memory metal inserted into a slot in the CRD housing, FIG. 3 shows a sealing ring of memory metal inserted into a slot, made around the CRD housing, in the reactor vessel wall, FIGS. 4, 5 show a sealing ring prior to insertion into the slot in FIG. 3 and after, and FIGS. 6, 7 show a different type of sealing ring prior to and after insertion into the slot in FIG. 3.

In certain types of nuclear power reactors, the nuclear reaction is controlled by means of control rods which are inserted into the reactor core from below. These control rods are operated by means of control rod drives (CRDs) running in tubular CRD housings, designated 1 in the figures, through the bottom of the reactor vessel. To make possible this passage through the reactor vessel wall 2, so-called CRD stub tubes 3 are welded, on the inside of the reactor vessel, around the holes in the wall 2 of the reactor vessel. The embodiment of the CRD stub tubes and the manner of welding them may vary but are shown, in principle, in the figures. Through the mentioned holes the tubular CRD housings 1 are inserted and are sealed against the CRD stub tube 3 by means of a weld 4 around the CRD housing 1. In this weld 4, or in the CRD stub tube 3, cracks may arise, in which case reactor water may leak out between the CRD stub tube 3 and the CRD housing 1 and further down between the CRD housing 1 and the reactor vessel wall 2. Since a nuclear power reactor of this type may accommodate as much as about 150 CRD stub tubes, maintenance and repair of these constitute an expensive problem because of the radioactive environment, and different ways of solving this problem have been attempted by using sealing sleeves over the weld 4 or, as mentioned, by rolling out the CRD housing 1 against the wall 2.

According to the invention, a method is now proposed which comprises achieving sealing between the CRD housing 1 and the reactor vessel wall 2 by means of sleeves or rings of memory metal.

According to a first alternative, the major part of that part of the CRD housing 1 which is positioned in the hole through the reactor vessel wall 2 is cut away and replaced by a first sleeve 5 of memory metal. At a temperature above the transient temperature, which for a memory metal of the alloy type Fe-Cr-Ni-Mn-Si may be around 100° C., this first sleeve 5 is to have substantially the same dimensions as the removed part of the CRD housing 1 but, at least along part of the sleeve 5, a larger outside diameter than the inside diameter of the hole. Before the sleeve 5 is inserted in the place of the removed part, it is deformed at a temperature below the transient temperature into an outside diameter substantially equal to or smaller than that of the removed part. The sleeve 5 is suitably provided with threads at its two ends and the corresponding free ends of the CRD housing are likewise provided with threads. The sleeve 5 may thereafter be threaded onto the place of the removed part. Once in position in the hole through the vessel wall 2, the sleeve 5 is heated to above the transition temperature. The memory metal thereby strives to resume its original shape and the outer wall of the sleeve 5 is pressed with great force against the walls of the hole, thus obtaining a very good seal between the sleeve 5 and the vessel wall 2. The deformation of the sleeve 5 is suitably performed by some form of rolling operation. To achieve a satisfactory and durable joint between the lower part of the sleeve 5 and the CRD housing, the corresponding end of the housing is provided with a welded-on muff 6 which is internally provided with a thread fitting the thread of the sleeve 5.

According to a second alternative shown in FIG. 2, an internal slot 7 is provided in that part of the CRD housing 1 which runs through the vessel wall 2. A second sleeve 8, which above the transition temperature has substantially such dimensions as to fit into the slot but a larger outside diameter than the largest diameter of the slot 7, is deformed below the transition temperature into a diameter which permits inserting the sleeve 8 into the slot 7 through the CRD housing 1. In position in the slot 7, the sleeve 8 is heated to above the transition temperature, the sleeve 8 then attempting to resume its original shape and thus being pressed against the bottom of the slot 7 such that the wall of the CRD housing 1 below the slot 7 is, in turn, sealingly pressed against the vessel wall 2. In an alternative embodiment, the CRD housing is first rolled out against the surrounding vessel wall, whereupon the memory metal sleeve is inserted according to the above. In this way, the sealing pressure obtained by the rolling is strengthened and made permanent.

According to a third alternative, an external slot 9 is made in the vessel wall 2 around the CRD housing 1. A ring 10 of memory metal is inserted into this slot 9, which ring, above the transition temperature, has a larger outside diameter and a smaller inside diameter than the corresponding outside diameter and inside diameter, respectively, of the slot 9. Before the ring 10 is inserted into the slot, it is deformed below the transition temperature into a substantially smaller outside diameter and larger inside diameter, respectively, than the corresponding diameters of the slot 9. In position in the slot 9, the ring is heated to above the transition temperature, the ring then striving to resume its original shape and sealing against the CRD housing 1 and the reactor vessel wall 2.

Possible embodiments of the ring 10 are clear from FIGS. 4-7, showing a section of the ring 10 positioned in the slot 9. Thus, FIG. 4 shows a section of a ring 10 which has the shape of a frustum of a cone. In FIG. 4, the ring 10 has been deformed below the transition temperature into such dimensions that it may be inserted into the slot 9. In FIG. 5, the ring 10 has been heated to above the transition temperature and strives to resume its original shape, and it will then sealingly make contact with the side surfaces of the slot 9. FIGS. 6 and 7 show the same phases for a cylindrical ring 10.

We claim:

1. A method for sealing a leak between a CRD stub tube (3) arranged around a hole through a reactor vessel wall (2) and a tubular CRD housing (1) extending through the CRD stub tube (3) and the vessel wall (2), characterized in that part of the CRD housing (1) which is positioned in the hole is cut away and removed; that a first sleeve (5) of memory metal, which above the transition temperature of the memory metal has substantially the same dimensions as the removed part of the CRD housing (1) but at least along part of the sleeve (5) has a larger outside diameter than the inside diameter of the hole, below the transition temperature of the memory metal is deformed into an outside diameter substantially equal to the outside diameter of the removed part, whereupon the sleeve (5) is inserted into the place of the removed part and heated to above the transition temperature such that the outer wall of the sleeve (5) is sealingly pressed against the surrounding vessel wall (2).

2. A method for sealing a leak between a CRD stub tube (3) arranged around a hole through a reactor vessel wall (2) and a CRD housing (1) extending through the CRD stub tube (3) and the vessel wall (2), characterized in that inside that part of the CRD housing (1) which extends through the hole in the vessel wall (2) there is provided an internal slot (7) around the internal circumference of the CRD housing (1), whereupon a second sleeve (8) of memory metal with a larger outside diameter than the largest diameter of the slot (7) at a temperature above the transition temperature of the memory metal is deformed below the transition temperature into a smaller outside diameter than the inside diameter of the CRD housing (1), whereupon the sleeve (8) is inserted into the slot and heated above the transition temperature such that the sleeve (8) sealingly presses the outer wall of the CRD housing (1) against the vessel (2).

3. A method for sealing a leak between a CRD stub tube (3) arranged around a hole through the reactor vessel wall (2) and a tubular CRD housing (1) extending through the CRD stub tube (3) and the vessel wall (2), characterized in that on the outside of the reactor vessel there is provided an external slot (9) in the vessel wall (2) around the CRD housing (1); that a ring (10) of memory metal, which ring (10) above the transition temperature has a larger outside diameter and smaller inside diameter than the corresponding diameters of the slot (9), below the transition temperature of the memory metal is deformed into a substantially smaller outside diameter and larger inside diameter, respectively, than those of the slot (9) and is thereafter inserted into the slot (9) and heated to above the transition temperature such that the outer side of the ring is pressed against the vessel wall (2) and its inner side against the CRD housing (1).

4. A method according to claim 1, characterized in that the first sleeve (5) of memory metal is provided at its ends with threads and is threaded into corresponding threads arranged in the CRD housing (1).

5. A method according to claim 2, characterized in that before said slot (7) is provided, the wall of the CRD housing is rolled out against the wall of the hole.

6. A method according to claim 3, characterized in that the ring (10) is made as the casing of a frustum of a cone.

* * * * *